E. H. N. CLARKSON,
Assignor to F. B. SLOAN & F. S. CLARKSON.
Mortising-Machine.
No. 9,221. Reissued June 1, 1880.
Fig. 1.
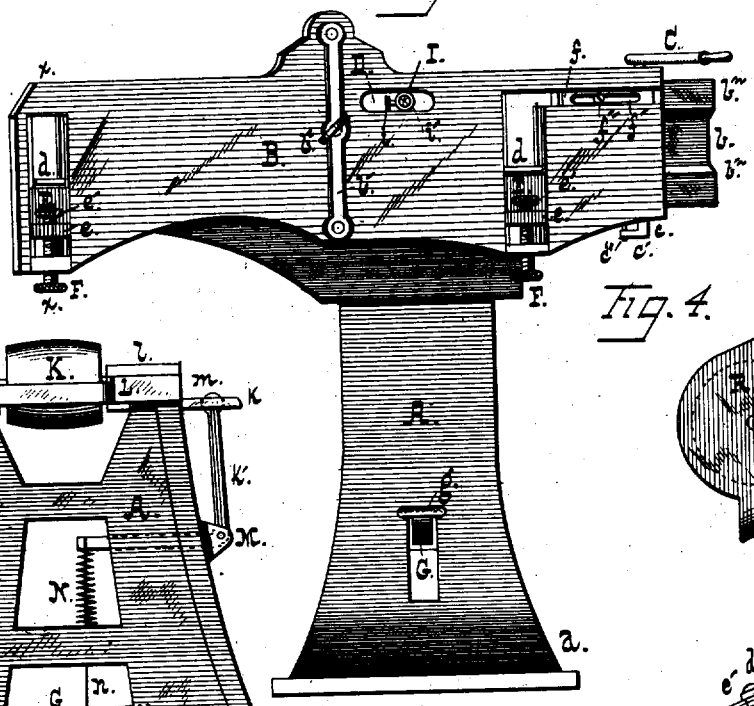
Fig. 3.
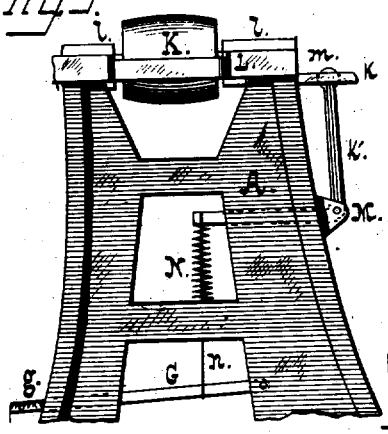
Fig. 4.
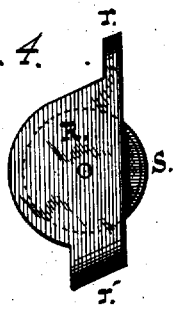
Fig. 2.
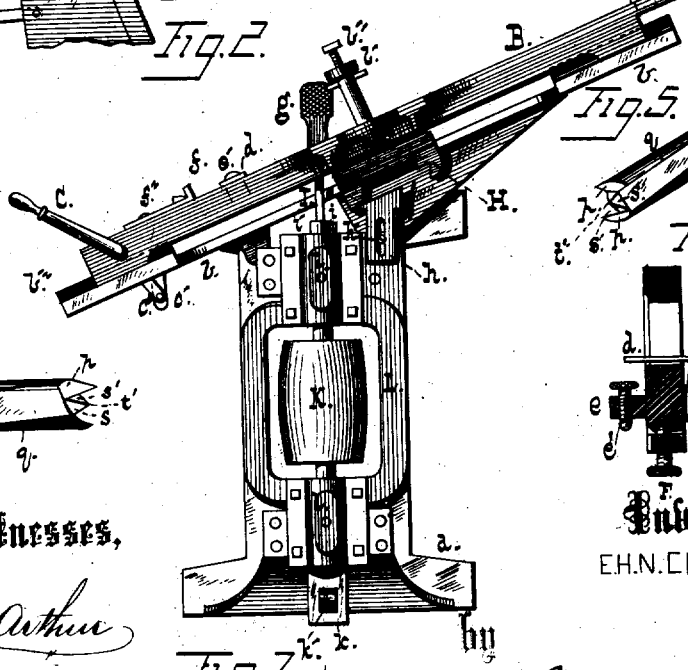
Fig. 5.
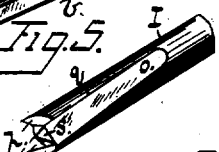
Fig 8.
Fig 6
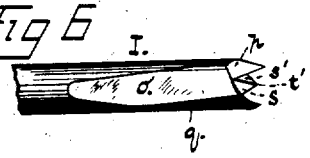
Fig 7
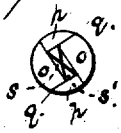
Witnesses,
W. C. McArthur
Jas M. Madigan.
Inventor,
E.H.N. CLARKSON.
by
A. D. Williams.
Attorney.
N. PETERS, PHOTO-LITHOGRAPHER, WASHINGTON, D. C.

UNITED STATES PATENT OFFICE.

EDWARD H. N. CLARKSON, OF BALTIMORE, MARYLAND, ASSIGNOR TO FRANK B. SLOAN AND FRANK S. CLARKSON, OF SAME PLACE.

MORTISING-MACHINE.

SPECIFICATION forming part of Reissued Letters Patent No. 9,221, dated June 1, 1880.

Original No. 216,722, dated June 24, 1879. Application for reissue filed April 20, 1880.

DIVISION A.

*To all whom it may concern:*

Be it known that I, EDWARD H. N. CLARKSON, of Baltimore city, State of Maryland, have invented certain new and useful Improvements in Mortising-Machines; and I hereby declare the same to be fully, clearly, and exactly described as follows, reference being had to the accompanying drawings, in which—

Figure 1 is a front elevation of the machine; Fig. 2, a plan view of the same; Fig. 3, a side elevation, showing a part of the device; Fig. 4, a side elevation of a sash-cord guide, forming the subject of a separate division of this reissue; Figs. 5, 6, and 7, respectively, perspective, side elevation, and end elevation of the bit; Fig. 8, a section on line *x x*, Fig. 1.

While my present invention relates to mortising-machines broadly, it is especially designed for furnishing a device for cutting a mortise of peculiar shape for the reception of a correspondingly-formed sash-cord guide constructed on the principle of that invented by William H. H. Kesler and me, and forming the subject of reissued Letters Patent No. 8,586, dated February 18, 1879.

As conducive to a clear understanding of the function of the machine about to be described, a brief description of the sash-cord guide may here be given.

Devices of this kind have heretofore consisted generally of a metallic casing having parallel ends, end flanges perforated for the securing-screws and containing a sheave for the sash-cord. The window-frames were generally mortised by hand, involving a considerable expenditure of time and resulting in a comparatively inferior fit.

The sash-cord guide shown is designed to fit in a machine-made mortise of peculiar shape, and incidentally obviate the necessity for but a single securing tack or screw. It is illustrated in Fig. 4 of the accompanying drawings, and consists of a casing, R, having rounded beveled ends *r r'*, the former being perforated, and a sheave, S. The device dovetails, as it were, into the window-frame, and is firmly secured by a single screw inserted through the perforation in the end *r*.

The essential features in a machine for cutting a mortise, or, rather, the mortises for this sash-cord guide, are, first, that it shall provide for the presentation of the window-frame to the bit, or vice versa, at a predetermined angle—namely, that of the end bevels of the sash-cord guide; second, that it shall effect a motion of the frame or bit, either as regards the other, to a distance measured by the length of the casing R; third, that these two motions shall alternate in such manner as to make a mortise having rests for the base and end flange of the casing; and, finally, that it shall provide for cutting the two mortises in each side of the frame.

My present invention consists in a device designed to accomplish these ends possessing points of novelty that are made the subject of the claims.

In the accompanying drawings, A is the bed of the machine, having a suitable base, *a*. At the front of the frame is secured a piece, *b*, having dovetail guides *b'''*, as shown, (see Figs. 1 and 2,) and arranged at an angle with the axis of the machine equal to that of the ends *r r'* with the face of the casing R of the sash-cord guide. Upon the guides *b'''* is mounted the front plate, B, through which passes a shaft, *c*, carrying a lever, C, at the end of the device. The lower end of this shaft is rigidly attached to a slotted arm, *c'*, and through the slot passes a pin, *c''*, depending from a lug on the piece *b*. As the lever *c* is moved the plate B is made to slide longitudinally on the guides *b'''*. A brace, *b'*, through which passes a thumb-screw, *b''*, is secured to the face of the plate B, and is designed to hold the window-frame to be mortised.

D is a slot, of sufficient length to admit of the proper longitudinal movement of the plate B, through which slot passes the bit I. Near either end of the plate is formed a vertical slot, in which slide blocks E E, carrying the rests *d* and *e'* for the frame. Upon these blocks are lugs *e*, projecting beyond the face of the plate B, and in them are mounted rests *e'*, consisting preferably of milled-head screws, the design being to admit of their ready vertical adjustment.

F F are set-screws passing through the piece at the bottom of the slots, and serving to raise and lower the blocks E. A stop, *f*, at right angles to the slots, serves to adjust the window-frame longitudinally, and is mounted in a recess in the face of the plate B, as shown, being made adjustable by means of the screw *f''* and slot *f'*.

L is a frame, carrying, in suitable boxes *l l*, the shaft *i'*, upon which is mounted a driving-pulley, K. The frame L is provided with slides having beveled faces *m*, Fig. 3, that reciprocate in correspondingly-formed bearings in the top of the frame A, so that the entire frame L may be moved back and forth in a right line. In the end of the shaft *i'* is secured, by means of a set-screw, *i*, the bit I, which is arranged to be projected through the slot D. The end piece, *k*, of the frame L is attached to one end of a bell-crank lever, *k'*, pivoted to the main frame at M, the other end of the lever being attached to a rod, *n*, that, in turn, is secured to a lever, G, projecting through a slot in the front of the main frame, where it is provided with a treadle-face, *g*. A spring, *n*, enveloping the rod *n*, serves to retain the frame L normally in its retracted position.

The mechanism already described is designed to effect the longitudinal and transverse motions of work and bit. That for determining the extent of these motions relatively as regards each other consists of the following elements: A form-plate, H, having a contour conforming to that of the proposed mortise, is secured on the rear side of the plate B, and a plate, *h*, adjustably secured by a set-screw, *h'*, and adapted to engage with the form-plate H, is mounted on the frame or carriage L in proper position to engage with the outlines of the former.

It is clear that, while the bit I may be made to describe every possible curve within the figure formed by the outline of the form-plate, outside of it it cannot go.

The bit I is of the construction shown in Figs. 5, 6, 7, being formed by cutting away from either side of a cylinder, forming faces *o o*, which do not extend clear across the cylinder, but turn at a little more than a right angle, and form keen longitudinal cutting-edges *q* where they meet the walls of the cylinder. From the faces *o* facets *p s* incline, respectively, to the walls of the cylinder opposite the cutting-edges *q*, and to the apex *t'* lateral facets *s*, completing the central point, which is somewhat pyramidal in shape, but having entering edges where the opposite facets *s s'* meet at either side. The object of this construction is to provide a bit that will enter itself, and once entered will cut laterally.

The operation of the device is as follows: The frame being laid on the rests *e'*, which are so adjusted that the bit will enter at the proper point, the stop *f* being so placed that the mortise shall be at the desired distance from the end of the frame, the clamp *b''*, &c., is turned, securing the work firmly to the face of the plate B. In this operation the spring-rests *d*, that are secured to the back of the blocks E by screws *d'*, are simply pressed back, and subserve at this time no function. The shaft *i'* being then set in motion, the operator presses on the treadle *g* and projects the bit forward to an extent limited by the first step in the form-plate. When the plate *h* brings up against the form-plate the operator moves the plate B laterally by means of the lever C until the plate *h* passes the next step on the form-plate H, when, the treadle being pressed, the bit enters farther, and so on throughout the contour of the form-plate. When one mortise is cut a turn or two of the set-screw releases the work, which is then raised until it passes the rests *d*, when the latter spring forward and project from the face of the plate B, when the work is laid upon them, again secured, and the second slot is cut, as just described.

The relative adjustment of the stops or rests is, of course, so arranged that the slots occupy the proper position in the window-frame, being separated by a distance equal to one thickness of sash, plus the thickness of the center bead.

Such is, in general terms, a description of the construction and operation of the device.

It is obvious that the machine may be made to cut a mortise of any desired outline, always excepting, of course, any undercutting beyond that provided for by the particular angle of the plate B as regards the axis of the bit.

Revolution of the plate B about a vertical axis might readily be provided for; but as the machine described is designed with a view to performing a single specific kind of work, I have not considered it necessary to indicate modifications rendering the machine capable of performing other work. Certain modifications, however, germane to the object in view, may well be mentioned. For instance, the relative positions of the form-plate and plate may be reversed. The motions of the plate B and bit may be made dependent on each other, or either may have imparted to it both motions. None of these changes are, however, believed to be desirable.

The machine as described is found to answer every requisite, performing its work accurately and quickly.

What I claim is—

1. In a mortising-machine, a revolving and reciprocating bit and a bed-plate movable transversely in relation thereto, in combination with a form carried by either and serving to limit the extent of motion of both, substantially as described.

2. In a mortising-machine, a revolving and reciprocating bit and a bed-plate movable in an inclined direction thereto, and carrying a form which engages with a finger upon the bit-frame and limits the motion of bit and bed-plate, as set forth.

3. In a mortising-machine, for the purpose set forth, the combination, with the bit and bed-plate having a transverse relative motion, of two sets of rests, arranged to support the work in proper position for forming the slots at the desired distance from each other and from the sides of the frame, substantially as described.

4. In combination with the bit and bed-plate, the stops *e* and spring-stops *d*, substantially as set forth.

5. In combination with the frame A, the sliding frame L, having treadle *g* and suitable intermediate connections, and the bit I, the bed-plate B, lever C, arm *c'*, and pin *c''*, attached to the fixed plate *b*, substantially as set forth.

EDW. H. N. CLARKSON.

Witnesses:
R. D. WILLIAMS,
JOHN C. GITTINGER.